US006654371B1

(12) United States Patent
Dunstan et al.

(10) Patent No.: US 6,654,371 B1
(45) Date of Patent: Nov. 25, 2003

(54) METHOD AND APPARATUS FOR FORWARDING MULTICAST DATA BY RELAYING IGMP GROUP MEMBERSHIP

(75) Inventors: Adam Dunstan, Cambridge, MA (US); Larry DiBurro, Haverhill, MA (US); Yunhou Li, Lowell, MA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/293,495

(22) Filed: Apr. 15, 1999

(51) Int. Cl.[7] .............................................. H04L 12/56
(52) U.S. Cl. ........................................ 370/390; 370/400
(58) Field of Search ................................ 370/390, 432, 370/312, 401, 381, 400

(56) References Cited

U.S. PATENT DOCUMENTS

| | | | |
|---|---|---|---|
| 4,740,954 A | | 4/1988 | Cotton et al. |
| 5,291,477 A | | 3/1994 | Liew |
| 5,309,433 A | | 5/1994 | Cidon et al. |
| 5,331,637 A | | 7/1994 | Francis et al. |
| 5,361,256 A | * | 11/1994 | Doeringer et al. |
| 5,434,855 A | | 7/1995 | Perlman et al. |
| 5,473,599 A | * | 12/1995 | Li et al. |
| 5,517,494 A | | 5/1996 | Green |
| 5,519,704 A | | 5/1996 | Farinacci et al. |
| 5,608,726 A | | 3/1997 | Virgile |
| 5,666,360 A | | 9/1997 | Chen et al. |
| 5,671,222 A | | 9/1997 | Chen et al. |

(List continued on next page.)

FOREIGN PATENT DOCUMENTS

| | | |
|---|---|---|
| GB | 2 320 159 A | 6/1998 |
| WO | WO 98/51041 | 11/1998 |

OTHER PUBLICATIONS

Tom Sheldon; Encyclopedia of Networking, Electronic Edition; 1998; pp. 653–659 & pp. 850–855; Osborne/McGraw–Hill, Berkeley, CA.
J. Moy; MOSPF: Analysis and Experience; Network Working Group; Mar. 1994; Document pp. 1–13, printed pp. 1–11.
W. Fenner; Domain Wide Multicast Group Membership Reports, Internet Draft; Internet Engineering Task Force; Inter–Domain Multicast Routing WG; Feb. 25, 1999. Document pp. 1–15, printed pp. 1–12.
T. Pusateri; Distance Vector Multicast Routing Protocol; Internet Draft; Juniper Networks; Sep. 1999; Document pp. 1–47, printed pp. 1–39.
W. Fenner; Internet Group Management Protocol, Version 2; Network Working Group; Nov. 1997; Document pp. 1–24, printed pp. 1–19.
J. Moy; Multicast Extensions to OSPF; Network Working Group; Mar. 1994; Document pp. 1–101, printed pp. 1–79.
J. Moy; OSPF Version 2; Network Working Group; Apr. 1998; Document pp. 1–244, printed pp. 1–168.
IEEE Communications Magazine, vol. 35 No. 1, Jan. 1997, Xylomeons 9. et al., "IP Multicast for Mobile Hosts", pp. 54–58 1997.*

Primary Examiner—Douglas W. Olms
Assistant Examiner—Ken Vanderpuge
(74) Attorney, Agent, or Firm—Blakely Sokoloff Taylor & Zafman (57) ABSTRACT

A method, apparatus and article of manufacture for forwarding multicast data by relaying IGMP group membership. A router is used to build a database of a plurality of interfaces and corresponding multicast groups, and the database is stored on the router. Information from the database is reported upstream to a multicast router. Multicast data is received from the multicast router and distributed to the plurality of interfaces based upon the database.

28 Claims, 5 Drawing Sheets

U.S. PATENT DOCUMENTS

| | | |
|---|---|---|
| 5,696,763 A | 12/1997 | Gang, Jr. |
| 5,774,465 A | 6/1998 | Lau et al. |
| 5,818,838 A | 10/1998 | Backes et al. |
| 5,831,975 A | 11/1998 | Chen et al. |
| 5,852,606 A | 12/1998 | Prince et al. |
| 5,898,686 A * | 4/1999 | Virgile ........................ 370/381 |
| 5,920,566 A | 7/1999 | Hendel et al. |
| 5,930,259 A | 7/1999 | Katsube et al. |
| 5,946,316 A | 8/1999 | Chen et al. |
| 5,982,775 A * | 11/1999 | Branner et al. .............. 370/401 |
| 5,999,530 A * | 12/1999 | Le Maine et al. .......... 370/390 |
| 5,999,981 A | 12/1999 | Willenz et al. |

\* cited by examiner

METHOD AND APPARATUS FOR FORWARDING MULTICAST DATA BY RELAYING IGMP GROUP MEMBERSHIP

FIELD OF THE INVENTION

This invention relates generally to data communications networks, and more particularly, to a method and apparatus for forwarding multicast data by relaying IGMP group membership.

BACKGROUND OF THE INVENTION

Computer networks are used to interconnect many computing resources, including computers, workstations servers, printers, modems, and storage devices. For example, two or more computers may be connected together through a network. Network users are able to share files, printers and other resources, send messages and run applications on remote computers.

One important feature of computer networks, such as the Internet, is the ability for a single sending station on the network to send the same information to multiple receiving stations. This feature is known as multicasting, and is commonly used to broadcast streaming data such as video or audio over the Internet. One disadvantage of streaming data applications is the requirement for a relatively high bandwidth data link between the sender and the receivers to distribute a large number of data packets associated with the streaming data. The large bandwidth requirement of streaming data becomes an even greater problem when multiple users are receiving the same streaming data at the same site. Without some mechanism to reduce the number of data packets, sites with multiple users may quickly become clogged with the large number of duplicate data packets being sent simultaneously to multiple users in a streaming data application.

To address this problem, the Internet Group Management Protocol (IGMP) has been developed. The IGMP allows a network administrator to designate one or more users as a member of a group. The list of members in the group is then typically communicated to a routing device on the network. A sender then has the ability to transmit a single data stream to the group, and the routing device handles the downstream distribution of packets to all of the members in the group.

To forward multicast data to downstream members, all intermediate routers are intended to run multicast protocols. Running multicast protocols is generally expensive because it introduces source and group states, and the routers have to maintain these states by exchange of a significant amount of signaling messages. At the network boundary, however, the routing is relatively simple and running multicast protocols represents a significant overhead. Therefore, there is a need for a way to forward multicast data by relaying IGMP group membership with a router.

SUMMARY OF THE INVENTION

The present invention provides a method, apparatus and article of manufacture for forwarding multicast data by relaying IGMP group membership. A router is used to build a database of a plurality of interfaces and corresponding multicast groups, and the database is stored on the router. Information from the database is reported upstream to a multicast router. Multicast data is received from the multicast router and distributed to the plurality of interfaces based upon the database.

DESCRIPTION OF THE DRAWINGS

The present invention is illustrated by way of example and may be better understood by referring to the following description in conjunction with the accompanying drawings, in which like references indicate similar elements and in which.

DESCRIPTION OF AN EMBODIMENT OF THE INVENTION

In the following description of an embodiment, reference is made to the accompanying drawings which form a part hereof, and in which is shown by way of illustration a specific embodiment in which the disclosed technology may be practiced. It is to be understood that other embodiments may be utilized and structural changes may be made without departing from the scope of the disclosed technology. An embodiment of the disclosed technology, described below, enables a remote computer system user to execute a software application on a network file server.

The disclosed technology provides a way of forwarding multicast data by relaying Internet Group Management Protocal (IGMP) group membership. A router is used to build a database of a plurality of interfaces and corresponding multicast groups, and the database is stored on the router. Information from the database is reported upstream to a multicast router. Multicast data is received from the multicast router and distributed to the plurality of interfaces based upon the database.

The disclosed technology provides for a simplified multicast capable network with an IGMP-Relay (IGMP-R). An IGMP-R device is typically a device acting on behalf of end-stations at network boundaries. An IGMP-R device logically functions as a host directly connected to a multicast routing capable device, known as a multicast router. It is used to relay group membership information on behalf of the end-stations and forward multicast packets between the multicast router and the end-stations. The disclosed technology provides for simplicity of configuration and bandwidth efficiency at network boundaries.

The disclosed technology does not run a multicast protocol and thus simplifies configuration and requires less memory and CPU resources than prior art implementations. The disclosed IGMP-R device depends on the multicast router to forward and receive multicast data as if the multicast flows were originated/destined for a network directly attached to the multicast router.

To support the disclosed technology, some multicast protocols are modified in order to forward multicast data originated from the end-stations. Multicast protocols, which do not use a unicast routing table, such as Multicast Open Shortest Path First (MOSPF) Distance Vector Multicast Routing Protocol (DVMRP), discard the data that originated from these end-stations because the networks are not known. Protocols such as Protocal Independent Multicast (PIM) dense use the unicast and can be implemented without modification with the disclosed technology. Other protocols which use the unicast table, such as PIM sparse and Core Bare Tree (CBT), must be modified to run with the disclosed technology.

The disclosed technology complies with the Internet Group Management Protocol, Version 2, RFC 2236, Xerox PARC, Nov. 1, 1997 by W. Fenner, which is incorporated herein by reference. On a downstream interface, the disclosed IGMP-R behaves as an IGMP router. On an upstream interface, the disclosed IGMP-R behaves as an IGMP host.

The disclosed technology at least provides the advantages given below.

1. IGMP-R with single upstream primary interface and multiple downstream interfaces.

2. IGMP-R with either dial-backup or standby demand interface as the upstream back-up.

3. IGMP-R with Hot Standby Router Redundancy.

4. MOSPF support in upstream Multicast Router.

Figure 1:
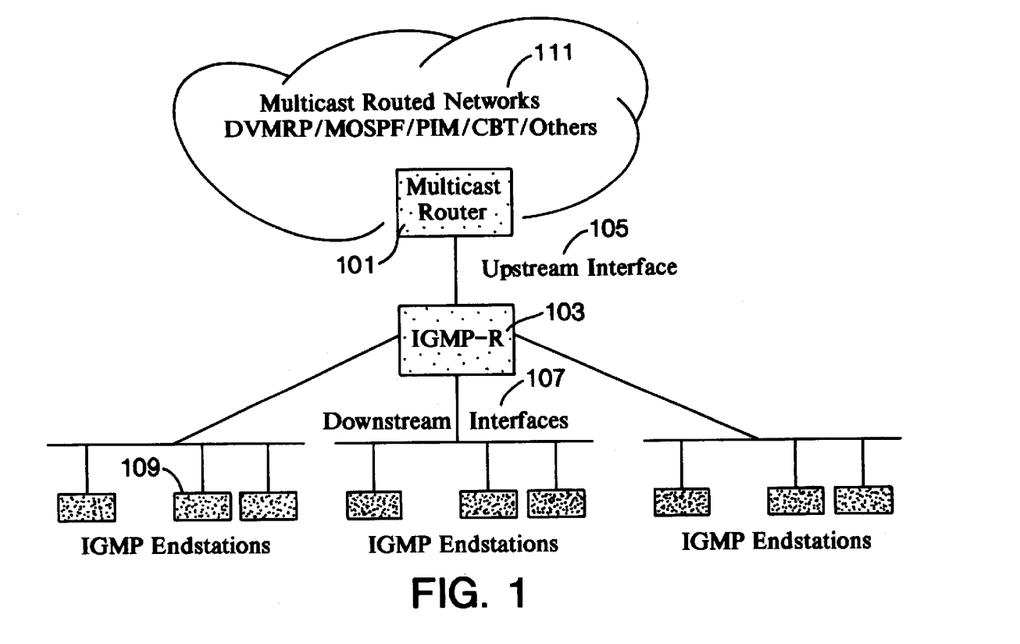
FIG. 1 shows an example for an IGMP relay compatible with the present invention.

FIG. 1 is a typical setup for an IGMP Relay (IGMP-R). A multicast router 101, which transmits information to and from one or more multicast routed networks 111, is connected to an IGMP-R 103 via an upstream interface 105. The interfaces connected to IGMP endstations 109 are called downstream interfaces 107. To the upstream multicast router 101, the IGMP-R 103 behaves as an IGMP endstation. To the downstream IGMP endstations 109, the IGMP-R 103 behaves as a multicast router.

When receiving multicast data packets from the upstream interface 105, the IGMP-R 103 forwards the data packets to appropriate downstream endstations 109 or links which are interested in the multicast group. When receiving multicast data from a downstream link, the IGMP-R 103 forwards the data packets to the upstream link and any downstream links interested in this group.

Figure 2:
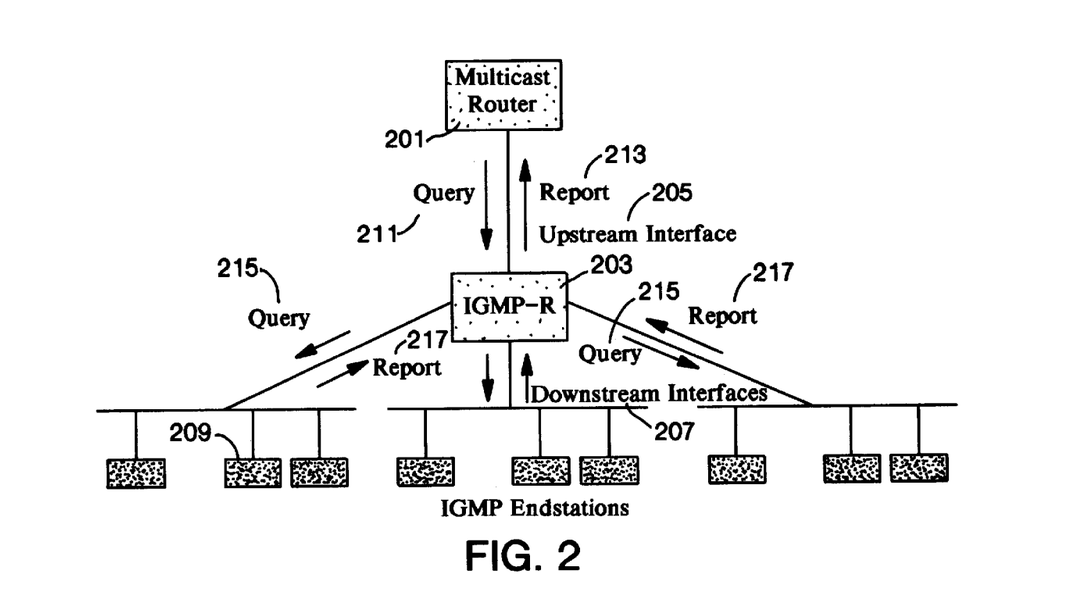
FIG. 2 shows an example IGMP-R relays group membership from downstream to upstream compatible with the present invention.

FIG. 2 illustrates how the disclosed IGMP-R relays group membership from downstream to upstream. The IGMP-R functions as an IGMP router on downstream links; it originates queries on downstream links; it learns the presence or absence of a group by receiving join or leave messages from downstream links. A multicast router 201 is connected to an IGMP-R 203 via an upstream interface 205. The interfaces connected to IGMP endstations 209 are called downstream interfaces 207. The IGMP-R 203 functions as an IGMP host on the upstream interface 205. When a new group appears on a downstream interface 207, the IGMP-R 203 originates an unsolicited report 213 on the upstream interface 205. When receiving a group-specific query 211 from the upstream interface 205, the IGMP-R 203 originates a report 213 for the group if there is a member in the downstream links 207. When receiving a general query 215, for each group in downstream links, the IGMP-R 203 originates a report 213. When a all member of a group leave the downstream interface 207, it sends a leave message on the upstream interface 205.

The IGMP-R 203 functions as an IGMP router on the downstream interface 207. The IGMP-R 203 originates membership query messages 215 on the downstream interface 207 as a querier. The IGMP-R 203 learns the presence of a group on the downstream interface 207 by receiving group membership report messages 217. The IGMP-R 203 learns the absence of a group from the downstream interface 207 by either receiving a group leave message or aging of the group. The interaction between the IGMP-R 203 and the endstations 209 complies with the IGMP protocol.

The IGMP-R 203 functions as an IGMP host on the upstream interface 205. When a new group appears on a downstream interface 207, the IGMP-R 203 originates an unsolicited group report 213 message on the upstream interface 205. If an existing group leaves or ages out on a downstream interface 207 and no other downstream interfaces are interested in this group, then the IGMP-R 203 sends a group leave message on the upstream interface 205. When the IGMP-R 203 receives a group-specific query from its upstream multicast router 201, it originates a group report message 213 for the specific group on the upstream interface 205 if the group is present on any downstream interfaces 207. When the IGMP-R 203 receives a general query 211, for each group joined on downstream interfaces 207, the IGMP-R 203 originates a group report message.

By default, the IGMP-R 203 originates a version 2 group membership report or leave message on the upstream interface 205. If the IGMP-R 203 receives a version 1 query, the IGMP-R 203 responds with version 1 of group membership report messages and suppress leaves. The IGMP-R 203 typically will not run multicast routing protocols on any interface.

On receipt of a multicast packet from its upstream interface 205, the IGMP-R 203 forwards the data packets to downstream interfaces 207 which are interested in the multicast group (i.e. the IGMP-R 203 received a group join). If, however, the source IP address of the multicast packet falls within a downstream network (i.e. loop detected), the packet is dropped.

On receipt of a multicast packet from a downstream interface 207, the IGMP-R 203 verifies the packet is sourced from the same downstream network before forwarding. Valid multicast packets are always forwarded on the upstream interface 205 and are forwarded to any downstream interfaces 207 interested in the group.

Figure 3:
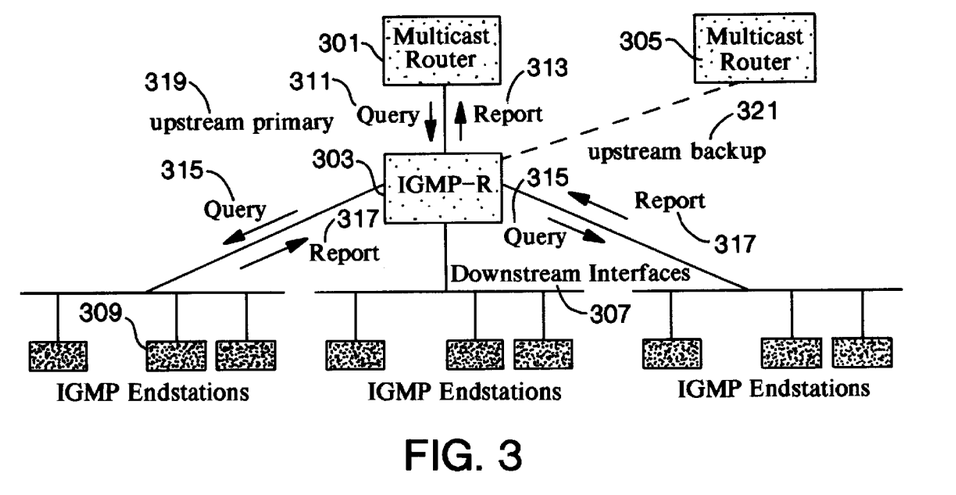
FIG. 3 shows how primary and upstream backup interfaces work in a manner compatible with the present invention.

As illustrated in FIG. 3, the IGMP-R 303 supports a second interface as an upstream backup 321. A multicast router 301 is connected to an IGMP-R 303 via an upstream primary interface 319. The interfaces connected to IGMP endstations 309 are called downstream interfaces 307. A backup multicast router 305 is connected to the IGMP-R 303 via an upstream backup interface 321.

The IGMP-R 303 typically has one upstream primary 319 and one backup interface 321. For example, the upstream primary 319 could be connected to a leased line or frame relay network, and the upstream backup 321 could be connected to a wide area network (WAN) switched connection, a dial-backup or another type of on-demand interface. If the upstream primary 319 fails, the upstream backup 321 automatically comes up and functions as if it were the upstream primary 319. The upstream backup 321 remains functional until the upstream primary 319 resumes its function.

The upstream backup 321 is typically kept down when the upstream primary 319 is up. However, there is a transitional period in which both the upstream primary 319 and the upstream backup 321 could be active. In this case, the IGMP-R 303 will originate group report or leave messages only on the upstream primary interface 319. Multicast data received from any downstream interfaces 307 will be forwarded to either the primary multicast router 301 only, the backup multicast router 305 only, or both 301 and 305 based on the IGMP-R 303 configuration.

Figure 4:
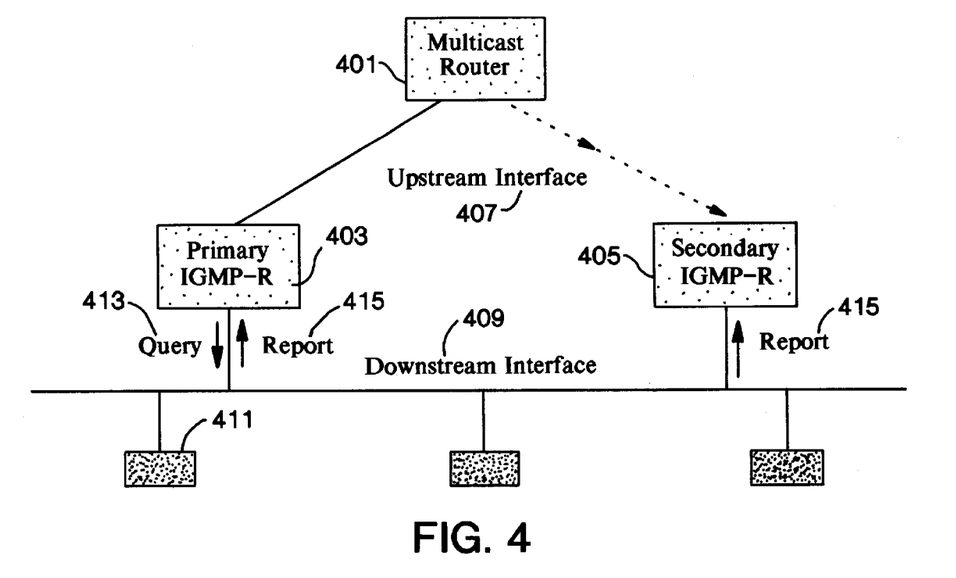
FIG. 4 shows IGMP relays with hot standby compatible with the present invention.

As illustrated in FIG. 4, multiple IGMP-R devices 403, 405 are connected to the same network when using router redundancy. The IGMP-R router 403 is configured as the primary, and the IGMP-R router 405 is configured as the secondary or backup router. When the primary 403 is active it is responsible for all IGMP-R functions as well as all other routing features (Internet Protocol (IP), Routing Information Protocol (RIP), etc.) associated with the multicast router 401. The secondary IGMP-R router 405 remains in a passive mode of a secondary state with the protocols loaded but not actively processing or sending information as a hot standby router.

If the primary IGMP-R router 403 is determined to be non-functional, the secondary IGMP-R router 405 takes over routing responsibilities which includes the IGMP-R functionality. The secondary IGMP-R router 405 transitions to the active primary state and the original primary IGMP-R router 403 transitions to the secondary state. In this manner the IGMP-R routers 403 and 405 alternate being the hot standby router.

Figure 5:
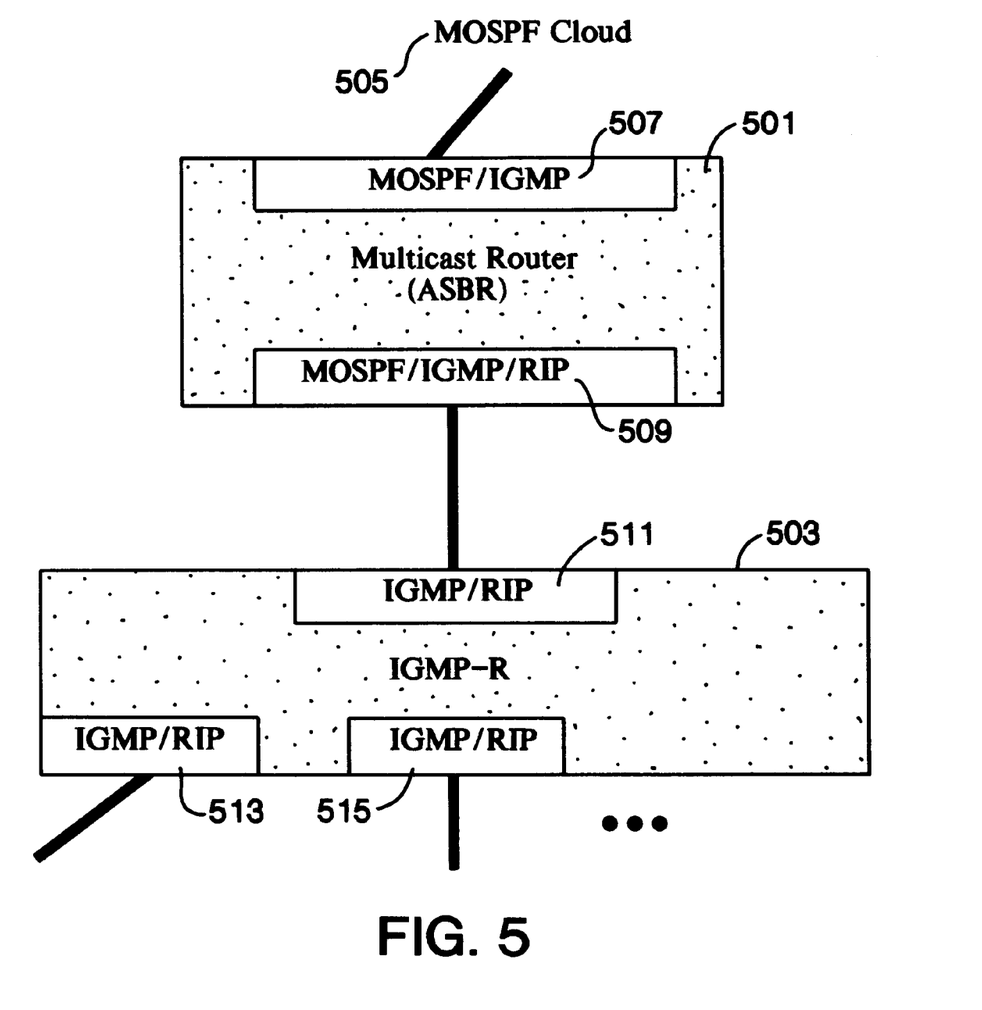
FIG. 5 shows a MOPSF multicast router environment compatible with the present invention.

FIG. 5 shows a typical MOPSF multicast router environment. As shown in FIG. 5, the multicast router 501) is configured with MOSPF 505 as an autonomus system boundary router (ASBR). An ASBR is required in order to import external routes. The multicast router interface 509 connected to the IGMP-R device 503 typically contains MOSPF, IGMP and RIP. It is important to note that MOSPF is configured on the IGMP-R device interface 509 but not on the IGMP-R device 503. Having MOSPF configured on the IGMP-R device interface 511 allows group membership information received from the IGMP-R device 503 to be advertised by MOSPF 505 as currently implemented.

In the example shown in FIG. 5, RIP is used as the unicast routing protocol in the IGMP-R device interface 511. In order to learn these routes, the multicast router 501 has RIP also configured on the IGMP-R interface 509. MOSPF 505 imports these RIP routes and advertises as multicast capable throughout the MOSPF 505 area, thus allowing multicast datagrams to be forwarded by other MOSPF multicast routers.

It is also possible and desirable to configure MOSPF 505 as not being a wildcard receiver. Typically, when a multicast router is configured as an ASBR it is also a wildcard receiver. However, since all group membership information is known and advertised by MOSPF 505 when attached to a IGMP-R device, being a wildcard receiver is not necessary.

In order to support an attached IGMP-R device 503, MOSPF 505 requires some additional features which are not provided in some implementations. These features are given below.

1. Advertise IGMP-R's downstream networks as multicast capable. The MOSPF multicast router 501 must be configured as an ASBR when attached to an IGMP-R device 503 in order to import and advertise external routes. In one embodiment, these routes are advertised without setting the multicast capable bit in the application service element (ASE). Thus, MOSPF 505 nodes would not forward data originated from these networks since they would not part of the multicast topology. Typically in such environments, DVMRP would be used along with MOSPF to provide multicast capabilities to these external routes.

With the IGMP-R device 503, external routes must be advertised to be multicast capable. In one embodiment, this capability is controlled by a global MOSPF management information base (MFB) attribute which must be set in the multicast router. By default, external routes will not be advertised as multicast capable.

2. Advertise group membership information reported by an IGMP-R, including point-to-point links. MOSPF 505 must advertise group membership information received from a IGMP-R device 503. Since MOSPF 505 must be running on the multicast router interface 509 to the IGMP-R device 503, group information learned on this interface is treated as any other and advertised. The additional feature required of MOSPF is to support such advertisements on all link types.

3. Forwarding multicast datagrams originated from IGMP-R's downstream networks. MOSPF 505 may support data forwarding originated from end-stations attached to a IGMP-Relay. The Multicast Shortest Path First calculation must include IGMP-R networks as if they are directly attached to the multicast router.

Figure 6:
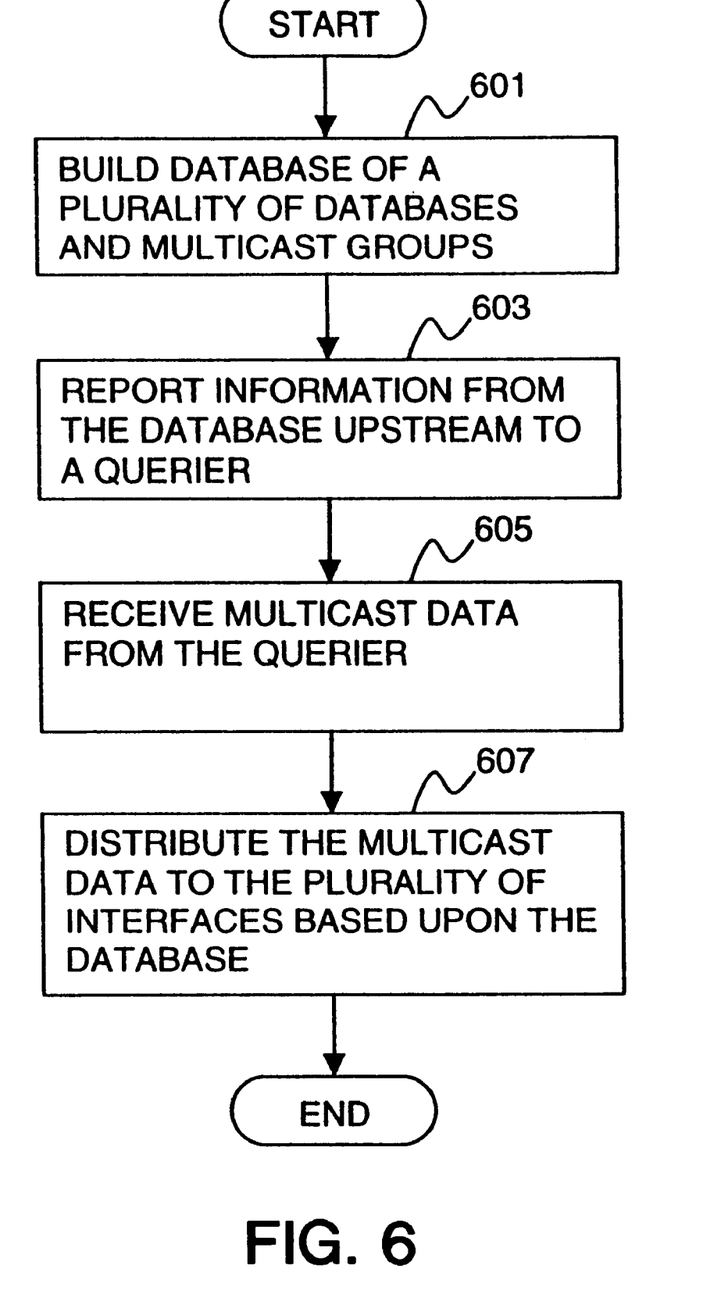
FIG. 6 shows a flowchart of an example method for forwarding multicast data by relaying IGMP group membership compatible with the present invention.

FIG. 6 shows a flowchart of an example method for forwarding multicast data by relaying IGMP group membership. At step 601, a router is used to build a database of a plurality of interfaces and corresponding multicast groups, and the database is stored on the router. At step 603, information from the database is reported upstream to a querier. At step 605, multicast data is received from the querier. At step 607, multicast data is distributed to the plurality of interfaces based upon the database.

Figure 7:
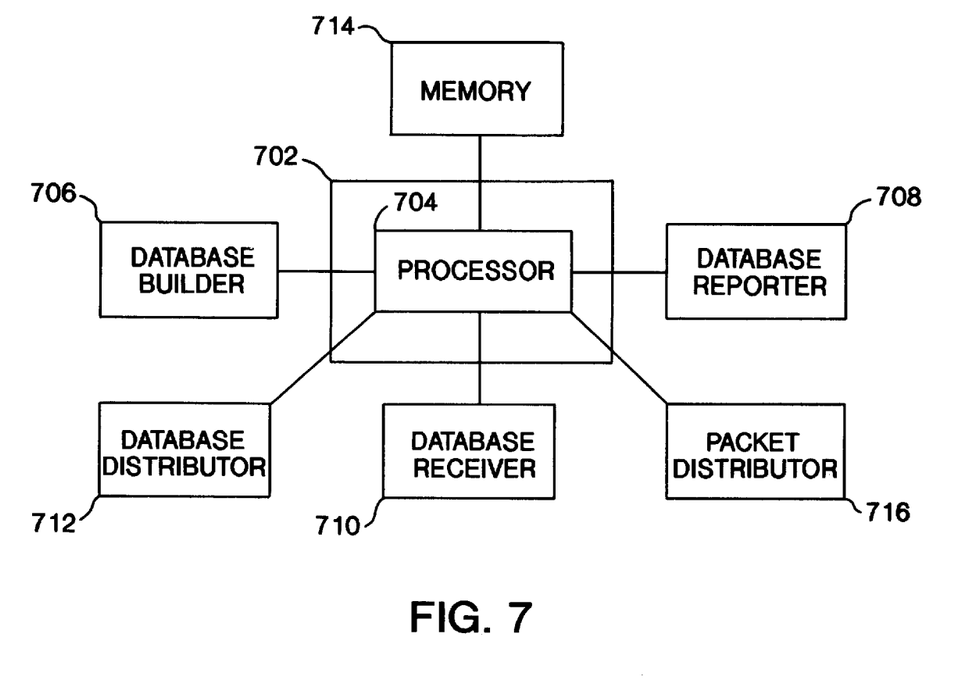
FIG. 7 illustrates an apparatus for routing multicast packets.

FIG. 7 illustrates an apparatus for routing multicast packets. The apparatus includes a router 702 which has a processor 704. The apparatus further includes a database builder 706 logically coupled to the processor 704 to build a database of a plurality of interfaces and corresponding multicast groups, a database reporter 708 logically coupled to the processor 704 to report information from the database upstream to a querier, a database receiver 710 logically coupled to the processor 704 to receive multicast data from the querier, a database distributor 712 logically coupled to the processor 704 to distribute the multicast data to the plurality of interfaces based upon the database, a memory 714 logically coupled to the processor to store the database on the router, and a packet distributor 716 to distribute group packet information to the plurality of interfaces based on the database or to distribute protocol information to a backup router. The backup router may comprise a hot standby router.

While the disclosed technology is described in terms of embodiments in a specific system environment, those of ordinary skill in the art will recognize that the disclosed technology can be practiced, with modification, in other and different hardware and software environments within the spirit and scope of the appended claims.

What is claimed is:

1. In a data communications network, a method of routing multicast packets between a multicast router and endstations without using a multicast protocol, the method comprising:

using a network relay to build a database of a plurality of interfaces coupled to the endstations and corresponding groups of endstations to transceive multicast data;

reporting group information from the database upstream to a querying multicast router in response to its query;

receiving multicast data from the querying multicast router for distribution to the groups of endstations to transceive multicast data; and distributing the multicast data to the plurality of interfaces based upon database information of the plurality of interfaces coupled to the endstations and corresponding groups of endstations to transceive multicast data.

2. The method of claim 1 further comprising:
storing the database in the network relay.

3. The method of claim 1 further comprising:
distributing group packet information to the plurality of interfaces based upon the database information of the plurality of interfaces coupled to the endstations and corresponding groups of endstations to transceive multicast data.

4. The method of claim 1 further comprising:
distributing protocol information to a backup network relay.

5. The method of claim 4 wherein,
the network relay includes a router and the backup network relay includes a hot standby router.

6. An apparatus for routing multicast packets between a multicast router and endstations without having the apparatus execute a multicast protocol, the apparatus comprising:
a network relay having a processor;
a database builder logically coupled to the processor to build a database of a plurality of interfaces coupled to the endstations and corresponding groups of endstations to transceive multicast data;
a database reporter logically coupled to the processor to report group information from the database upstream to a querying multicast router in response to its query;
a database receiver logically coupled to the processor to receive multicast data from the querying multicast router for distribution to the groups of endstations to transceive multicast data; and
a database distributor logically coupled to the processor to distribute the multicast data to the plurality of interfaces based upon database information of the plurality of interfaces coupled to the endstations and corresponding groups of endstations to transceive multicast data.

7. The apparatus of claim 6 further comprising:
a memory logically coupled to the processor to store the database in the network relay.

8. The apparatus of claim 6 further comprising:
a packet distributor to distribute group packet information to the plurality of interfaces based upon the database information of the plurality of interfaces coupled to the endstations and corresponding groups of endstations to transceive multicast data.

9. The apparatus of claim 6 further comprising:
a packet distributor to distribute protocol information to a backup network relay.

10. The apparatus of claim 9 wherein,
the network relay includes a router and the backup network relay includes a hot standby router.

11. An article of manufacture for use in a computer system to route multicast packets between a multicast router and endstations using a network relay without the network relay executing a multicast protocol, the article of manufacture comprising a computer usable medium having computer readable program code means embodied in the medium, the program code means including:
computer readable program code means embodied in the computer usable medium for causing a computer to use the network relay to build a database of a plurality of interfaces coupled to the endstations and corresponding groups of endstations to transceive multicast data;
computer readable program code means embodied in the computer usable medium for causing a computer to report group information from the database upstream to a querying multicast router in response to its query;
computer readable program code means embodied in the computer usable medium for causing a computer to receive multicast data from the querying multicast router for distribution to the groups of endstations to transceive multicast data; and
computer readable program code means embodied in the computer usable medium for causing a computer to distribute the multicast data to the plurality of interfaces based upon database information of the plurality of interfaces coupled to the endstations and corresponding groups of endstations to transceive multicast data.

12. The article of manufacture of claim 11 further comprising:
computer readable program code means embodied in the computer usable medium for causing a computer to store the database in the network relay.

13. The article of manufacture of claim 11 further comprising:
computer readable program code means embodied in the computer usable medium for causing a computer to distribute group packet information to the plurality of interfaces based upon the database information of the plurality of interfaces coupled to the endstations and corresponding groups of endstations to transceive multicast data.

14. The article of manufacture of claim 11 further comprising:
computer readable program code means embodied in the computer usable medium for causing a computer to distribute protocol information to a backup network relay.

15. The article of manufacture of claim 14 wherein,
the network relay includes a router and the backup network relay includes a hot standby router.

16. The method of claim 1 further comprising:
broadcasting a query through the plurality of interfaces to endstations to determine the presence of groups.

17. The method of claim 16 further comprising:
receiving group membership report messages at the plurality of interfaces from endstations in response to the broadcasting of the query, the group membership reports indicating the presence of groups.

18. The method of claim 1 wherein,
the network relay is an Internet Group Management Protocol (IGMP) network relay device and the protocol executed by the endstations is Internet Group Management Protocol (IGMP), the corresponding groups of endstations desiring to transceive multicast data are IGMP groups, and IGMP group membership is reported from the database upstream to a querying multicast router.

19. The article of manufacture of claim 11 further comprising:
computer readable program code means embodied in the computer usable medium for causing a computer to broadcast a query through the plurality of interfaces to endstations to determine the presence of groups.

20. The article of manufacture of claim 19 further comprising:
computer readable program code means embodied in the computer usable medium for causing a computer to receive group membership report messages at the plurality of interfaces from endstations in response to the broadcasting of the query, the group membership reports indicating the presence of groups.

21. The article of manufacture of claim 11 wherein,
the network relay is an Internet Group Management Protocol (IGMP) network relay device and the protocol executed by the endstations is Internet Group Management Protocol (IGMP), the corresponding groups of endstations desiring to transceive multicast data are IGMP groups, and IGMP group membership is reported from the database upstream to a querying multicast router.

22. An IGMP network relay for routing multicast packets between a multicast router and endstations, the IGMP network relay comprising:

a first processor;

a first memory coupled to the first processor;

a first upstream interface to couple to the multicast router;

at least one downstream interface to couple to the endstations; and wherein, the IGMP network relay functions as an IGMP host on the first upstream interface and as an IGMP router on the at least one downstream interface.

23. The IGMP network relay of claim 22 wherein,
the IGMP network relay broadcasts a query over the at least one downstream interface to determine IGMP group membership of endstations coupled to the at least one downstream interface.

24. The IGMP network relay of claim 23 wherein,
the IGMP network relay receives IGMP group membership report messages over the at least one downstream interface to indicate the IGMP group membership of endstations coupled to the at least one downstream interface.

25. The IGMP network relay of claim 22 wherein,
the IGMP network relay receives a query over the first upstream interface requesting IGMP group membership of the IGMP network relay.

26. The IGMP network relay of claim 25 wherein,
the IGMP network relay transmits a group report message over the first upstream interface to indicate the IGMP group membership of endstations coupled to the at least one downstream interface.

27. The IGMP network relay of claim 22 further comprising:

a second upstream interface to couple to the multicast router through a second connection differing from a first connection.

28. The IGMP network relay of claim 22 further comprising:

a second processor;

a second memory coupled to the second processor;

a second upstream interface to couple to the multicast router;

another at least one downstream interface to couple to the endstations; and wherein, the second processor, the second memory, the second upstream interface, and the another at least one downstream interface provide hot standby redundancy.

* * * * *